Figure 1:
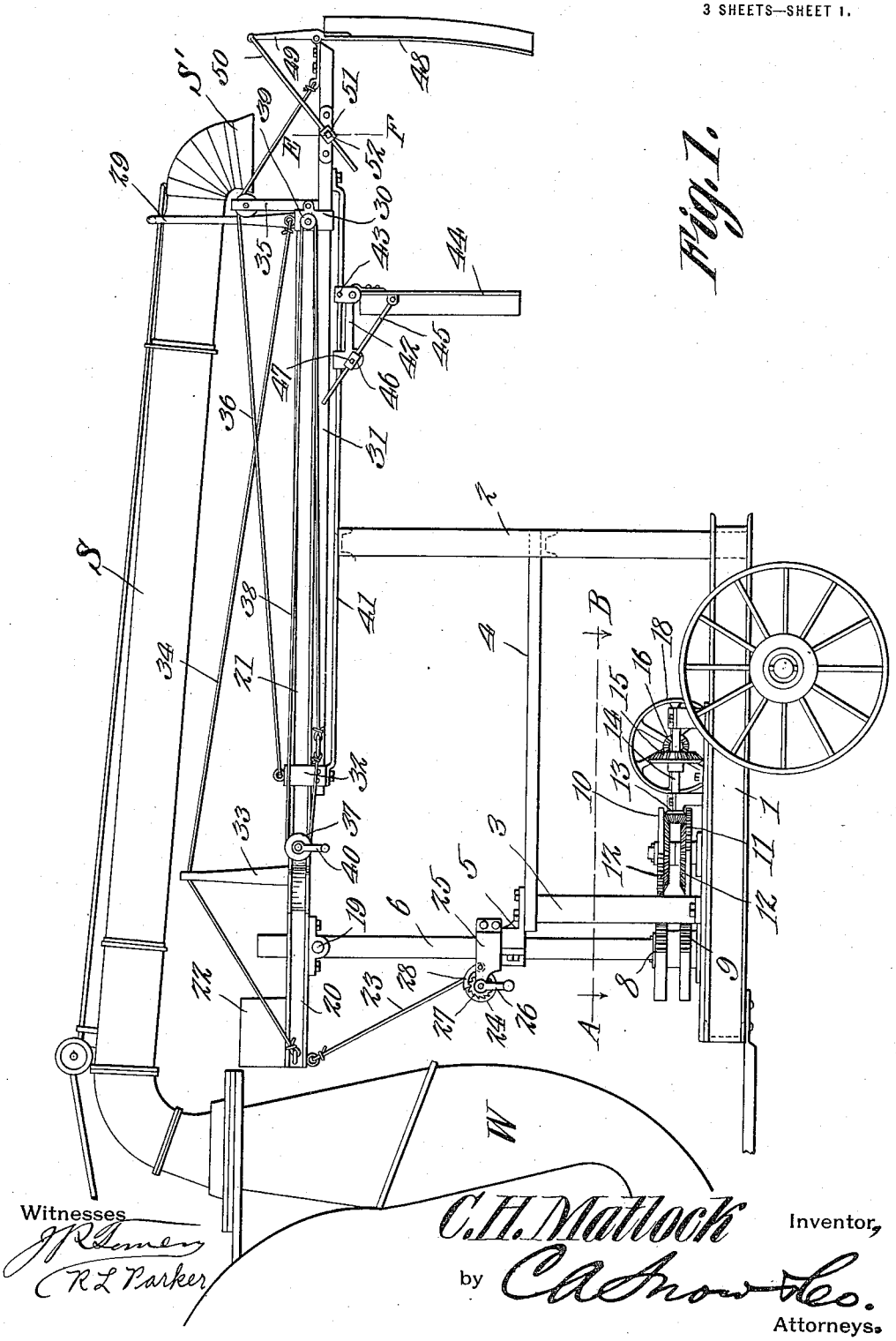

C. H. MATLOCK.
STACK SHAPING MACHINE.
APPLICATION FILED JUNE 9, 1915.

1,173,674.

Patented Feb. 29, 1916.
3 SHEETS—SHEET 1.

Witnesses

C. H. Matlock, Inventor,
by C. A. Snow & Co.
Attorneys.

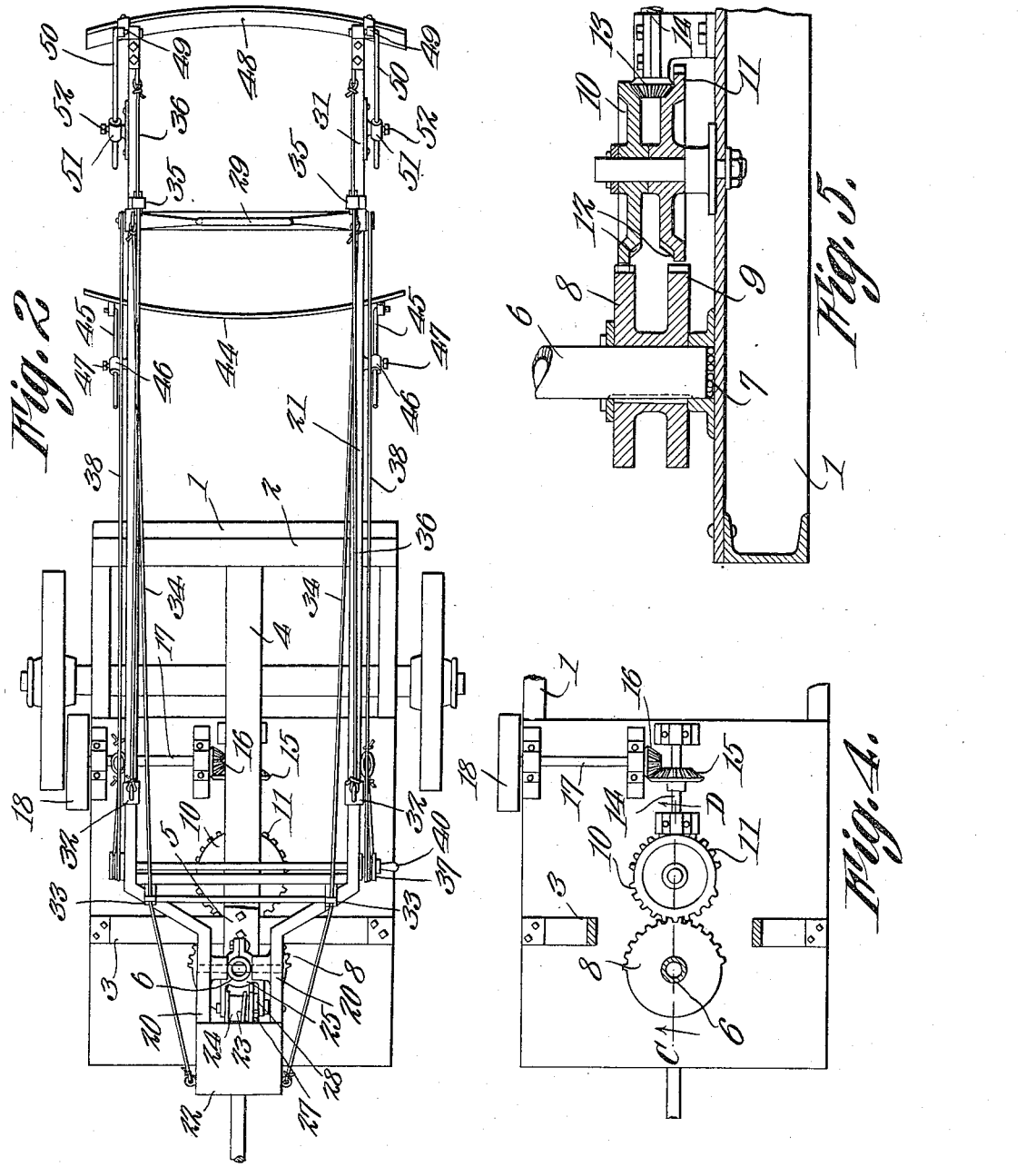

C. H. MATLOCK.
STACK SHAPING MACHINE.
APPLICATION FILED JUNE 9, 1915.
1,173,674.
Patented Feb. 29, 1916.
3 SHEETS—SHEET 3.
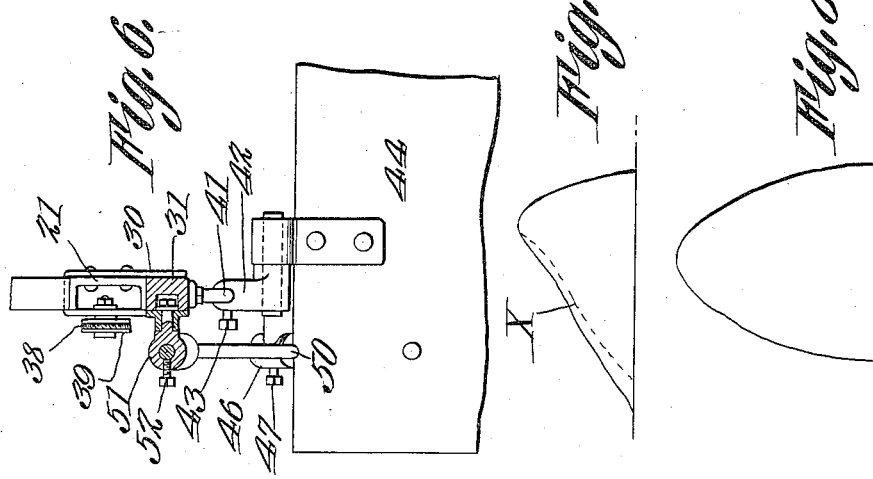
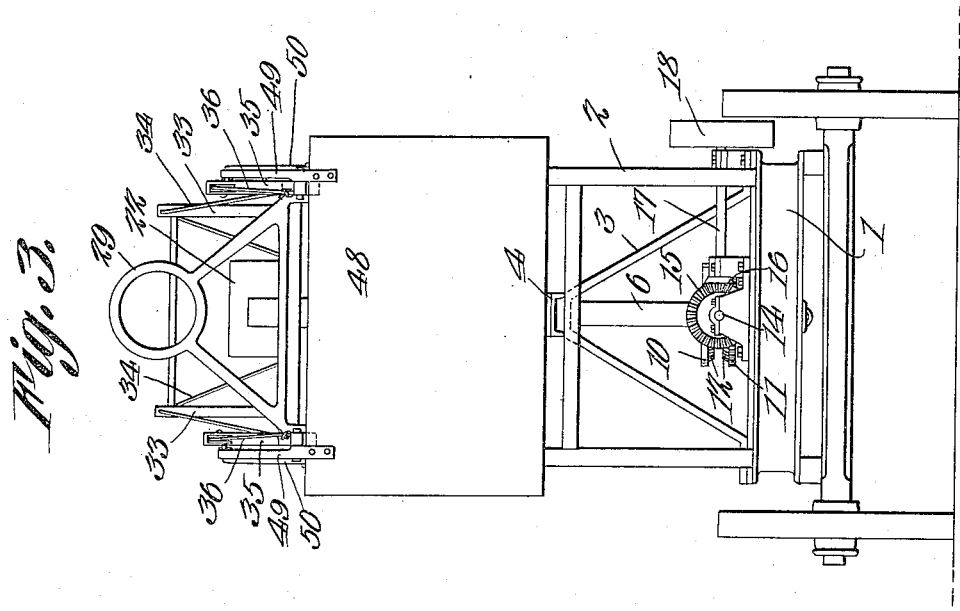
Witnesses
J. P. Gowdin
R. L. Parker
C. H. Matlock
Inventor,
by C. A. Snow & Co.
Attorneys.

UNITED STATES PATENT OFFICE.

CHARLES H. MATLOCK, OF EMDEN, ILLINOIS.

STACK-SHAPING MACHINE.

1,173,674.  Specification of Letters Patent.  Patented Feb. 29, 1916.

Application filed June 9, 1915. Serial No. 33,119.

*To all whom it may concern:*

Be it known that I, CHARLES H. MATLOCK, a citizen of the United States, residing at Emden, in the county of Logan and State of Illinois, have invented a new and useful Stack-Shaping Machine, of which the following is a specification.

This invention relates to a stack building machine especially designed for use in connection with wind stackers. Although wind stackers are in general use because of their efficiency in directing straw from the machine to the stack, it has been practically impossible to prevent the straw from blowing over the stack while the outer portion of the stack is being built up, this being especially true as the stack grows to considerable height. Because of the dust delivered from the wind stacker with the straw, it is useless for any persons to endeavor to build the stack by hand as the straw is delivered from the wind stacker. Consequently the stack of straw built up by the wind stacker is of an unsightly shape presenting an extensive top surface from which moisture will not drain readily and which therefore results in the loss of considerable straw which rots on the stack.

One of the objects of the present invention is to provide a machine for use in connection with a wind stacker and which will permit a stack to be built up symmetrically into substantially oval form so that the same will drain perfectly, thus reducing waste to the minimum.

A further object is to provide a machine of this character which can be controlled readily without requiring the operators to stand in the dust discharged from the stacker.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the machine combined with a portion of a wind stacker. Fig. 2 is a plan view of the machine. Fig. 3 is an end elevation. Fig. 4 is a section on line A—B Fig. 1. Fig. 5 is an enlarged section on line C—D Fig. 4. Fig. 6 is an enlarged section on line E—F Fig. 1, said section being taken through one side portion of the machine. Fig. 7 is a detail view on a reduced scale of a stack such as ordinarily formed by a wind stacker. Fig. 8 is a similar view showing a stack such as produced by the use of the machine constituting the present invention.

Referring to the figures by characters of reference 1 designates a wheel supported frame adapted to be coupled in any suitable manner to the wind stacker W the stack or flue S of which may be of the usual construction capable of swinging in different directions relative to the structure W. Mounted on the frame 1 is an upstanding front frame 2 and an upstanding rear frame 3, the frame 3 being shorter than the frame 2 and being connected thereto by substantially horizontal connections 4. A bearing member 5 extends from the frame 3 and journaled therein is a post 6 the lower end of which is provided with a thrust bearing 7 and has secured to it upper and lower mutilated gears 8 and 9 respectively, the teeth on each gear extending along about one-half the circumference of the gear. These gears 8 and 9 are respectively engaged by upper and lower intermediate gears 10 and 11 each of which has teeth extending along about one-half the circumference thereof, the teeth on one of these gears being disposed oppositely to the teeth on the other gear so that, when gear 10 moves out of mesh with its gear 8, the gear 11 will move into mesh with its gear 9, and vice versa. Each gear 10 and 11 is formed with or secured to a bevel gear 12 and the two bevel gears constantly mesh with a drive gear 13 secured to a longitudinal shaft 14 which receives motion, through a gear 15, from a gear 16 secured to a transverse shaft 17. This transverse shaft is adapted to be driven in any suitable manner, as by means of a pulley 18.

Pivotally connected to the upper portion of the post 6, as at 19, are spaced arms 20 extending rearwardly from one end of a tiltable frame 21 which extends over the upstanding frame 2. The rear ends of the arms 20 support a counterbalance 22 and said arms are connected by a cable 23 or the like to a spool 24 mounted for rotation in a bracket 25 carried by the post 6. This spool may be rotated in any suitable manner, as by means of a crank 26 and a ratchet wheel 27 and pawl 28 are provided for holding the spool against rotation in one direction, thus preventing the connection 23 from unwinding.

Upstanding from the front end of the frame 21 is a guide ring 29 through which the flue S extends loosely so that the spout S' at the free end of the flue will discharge downwardly across the end of the frame 21. The flue S may be provided with the usual or any preferred means for extending and retracting it.

Depending from the sides of frame 21 at the outer ends thereof are guide plates 30 and slidably mounted between these guide plates is an extension frame 31 having sleeves 32 at its rear end and which slidably engage the sides of the frame 21. The frame 21 is reinforced longitudinally by a truss made up of upstanding posts 33 engaged by cables 34 or the like which are secured at their ends to the end portions of the frame. Longitudinal reinforcement of the frame 31 is effected by the use of upstanding posts 35 movably engaged by cables 36 or the like which are secured to the ends of the frame 31, the posts 35 being secured to the forward end of the frame 21. A spool 37 is journaled upon one side of the frame 21 and engages an adjusting cable 38 or the like which extends around a sheave 39 on the forward end portion of frame 21. The ends of the cable 38 are secured to the extension frame 31. Thus it will be seen that when the spool 37 is rotated in one direction frame 31 will be shifted longitudinally beyond the front end of frame 21 and, when spool 37 is rotated in the opposite direction, the extension frame 31 will be retracted. Spool 37 can be rotated in any manner desired, as by means of a crank 40.

Secured to and extending longitudinally under the sides of the extension frame 31 are guide rails 41 and adjustably mounted on each of these guide rails is a slide 42 adapted to be held against movement by means of a set screw 43 or in any other manner desired. Hingedly connected to and depending from the slides is a shield 44 preferably bowed from one side to the other and provided, at its sides, with brace rods 45. These rods are pivotally connected to the shield and are slidably mounted within sleeves 46 on the respective slides 42. Set screws 47 are employed for holding the braces 45 against movement within the sleeves 46 although it is to be understood that any other means desired may be employed for this purpose. By loosening the braces 45 within the sleeves 46, the shield 44 can be adjusted angularly relative to the slides 42 and then secured by the binding means 47.

Hingedly connected to the outer end of the extension frame 31 is an outer shield 48 bowed transversely, this shield having upwardly extending arms 49 at the sides thereof. A brace 50 is pivotally connected to each arm and is slidably mounted in a sleeve 51 mounted upon one side of the frame 31. Any suitable means, such as a set screw 52, may be employed for holding the brace 50 against movement within the sleeve 51. By providing the adjustable braces 45 and 50 it will be apparent that the two shields 44 and 48 can be adjusted angularly toward or from each other. Furthermore by utilizing adjustable slides 42, the shield 44 can be adjusted toward or from the shield 48.

As has heretofore been pointed out, a stack formed by the use of a wind stacker is not symmetrical. As the stack is built up the straw directed thereonto will pass over the stack and build out the bottom portion thereof to an objectionable extent with the result that the stack will not properly drain and will ultimately appear as illustrated in Fig. 7. By reason of the poor drainage a large percentage of the straw forming the stack will rot to a depth approximately equal to that indicated by the dotted line X in Fig. 7. Heretofore, in order to properly shape a stack formed by a wind stacker, it has been necessary to have men stand close to the discharge end of the flue of the wind stacker and shape the stack as the straw is discharged. This occupation injures the health of the laborers because of the quantities of dust discharged from the flue with the straw and the objections to work of this character have been such that it is practically impossible to properly shape a stack where a wind stacker is used.

By providing a machine such as herein described, the straw, when discharged from the flue 5, will be directed into the space between the shields 44 and 48, the outer shield 48 preventing the straw from blowing over the stack during the formation of the outer surface of the stack, while the shield 44 will prevent the straw from becoming displaced inwardly over the stack. During the formation of the stack, the post 6 will be rotated back and forth, thus producing a horizontal oscillation of the frame 21 and the parts carried thereby and during such oscillation the extension frame 31 can be adjusted outwardly and inwardly so that the stack can thus be built up along symmetrical lines so that it will ultimately be shaped approximately as illustrated in Fig. 8, thus insuring perfect drainage and reducing waste to the minimum. As the apex of the stack is reached the shields can be adjusted toward each other, thus restricting the space into which the straw is discharged and insuring a proper finish to the top of the stack.

Angular adjustment of the frame 21 about the pivot 19 is effected by means of the spool 24 and connection 23, as will be obvious. By providing the ring 29, the flue S is caused to swing laterally with the frame 21 so that the straw will always be accurately discharged into the space between the shields 44 and 48.

It is to be understood that instead of mounting the stack or flue S loosely in a ring 29, the same can be connected in any other desired manner to the structure so as to be properly centered while in operation. It is also to be understood that the entire apparatus can be worked by hand whenever necessary or desired.

What is claimed is:—

1. The combination with spaced shields, and means for separately adjusting the shields relative to each other, means for bodily moving the shields upwardly or downwardly together, means for bodily oscillating the shields laterally together, and means movable with the shields for holding the flue of a wind stacker to direct the contents of the stacker over one of the shields and downwardly into the space between the shields.

2. The combination with an extensible structure, a shield mounted for angular adjustment relative to said structure, and a second opposed shield mounted for slidable and angular adjustment relative to the first named shield, of means movable with the extensible structure for holding the flue of a wind stacker in position to direct its contents over one of the shields and downwardly into position between both shields.

3. A machine of the class described including a shield mounted for angular adjustment, a second shield mounted for sliding and angular adjustment, said shields being oppositely disposed and being bowed to shape a stack, and means for holding the flue of a wind stacker in position over one of the shields for directing its contents downwardly into the space between the shields.

4. The combination with an extensible structure, means for oscillating the same laterally, means for adjusting said structure angularly upwardly and downwardly irrespective of such oscillation, and means for extending and retracting the structure, of an outer shield hingedly connected to said structure, an inner shield hingedly and slidably connected to said structure, and means movable with the shields for holding the flue of a wind stacker in position to direct its contents into the space between the shields.

In testimony that I claim the foregoing as my own, I have hereto affixed my signature in the presence of two witnesses.

CHARLES H. MATLOCK.

Witnesses:
W. P. KUHL,
T. A. COX.